United States Patent [19]

Sisk

[11] Patent Number: 5,017,053

[45] Date of Patent: May 21, 1991

[54] AERATION DEVICE FOR BULK MATERIAL CONTAINERS

[76] Inventor: David E. Sisk, R.R. 1, Box 340, Bonne Terre, Mo. 63628

[21] Appl. No.: 302,310

[22] Filed: Jan. 25, 1989

Related U.S. Application Data

[63] Continuation-in-part of Ser. No. 286,240, Dec. 19, 1988.

[51] Int. Cl.⁵ .............................................. B65G 53/38
[52] U.S. Cl. ...................... 406/138; 406/91; 406/137; 366/101
[58] Field of Search ................ 406/90, 91, 136, 137, 406/138; 366/101, 106

[56] References Cited

U.S. PATENT DOCUMENTS

| | | | |
|---|---|---|---|
| 3,236,422 | 2/1966 | Bailey et al. | 406/91 |
| 3,343,888 | 9/1967 | Anderson et al. | 406/138 |
| 3,929,261 | 12/1975 | Solimar | 406/137 |

*Primary Examiner*—Joseph F. Peters, Jr.
*Assistant Examiner*—Christopher P. Ellis
*Attorney, Agent, or Firm*—Paul M. Denk

[57] ABSTRACT

An aeration device to facilitate the flow and discharge of bulk material granules through a discharge opening in a bulk material container is disclosed. The aeration device includes at least one self-supporting molded plastic hollow body which is adapted to overlie an air inlet in the bulk material container at a predetermined distance above the discharge opening thereof. Each of the molded plastic hollow body aeration devices include an inner arched wall which is adapted to face the air inlet in the bulk material container and an outer arched wall facing away from the air inlet. The molded plastic hollow body is formed in a porous construction having a plurality of openings of predetermined porosity along the inner arched wall, a plurality of openings of predetermined smaller porosity along the outer arched wall, and inner tortuous pathways ending between the openings in the inner and outer arched walls. Air is evenly distributed throughout the molded plastic hollow body in order to provide faster and more complete bulk unloading, while minimizing or eliminating damaging back air pressure.

8 Claims, 2 Drawing Sheets

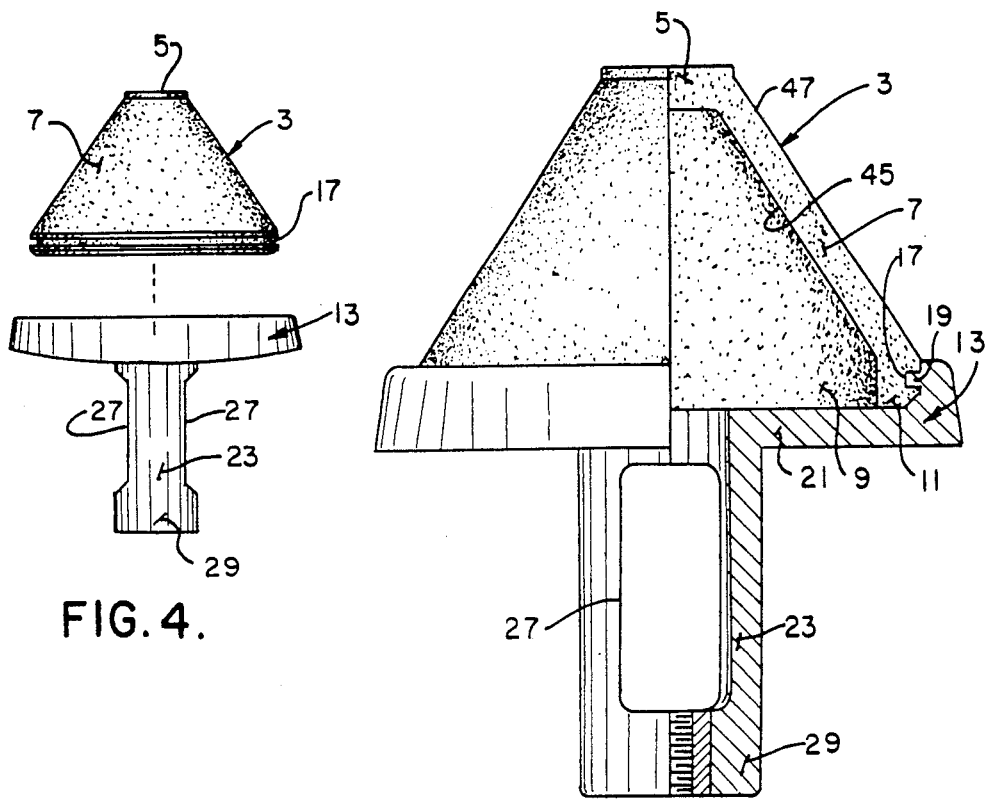
FIG. 4.
FIG. 5.
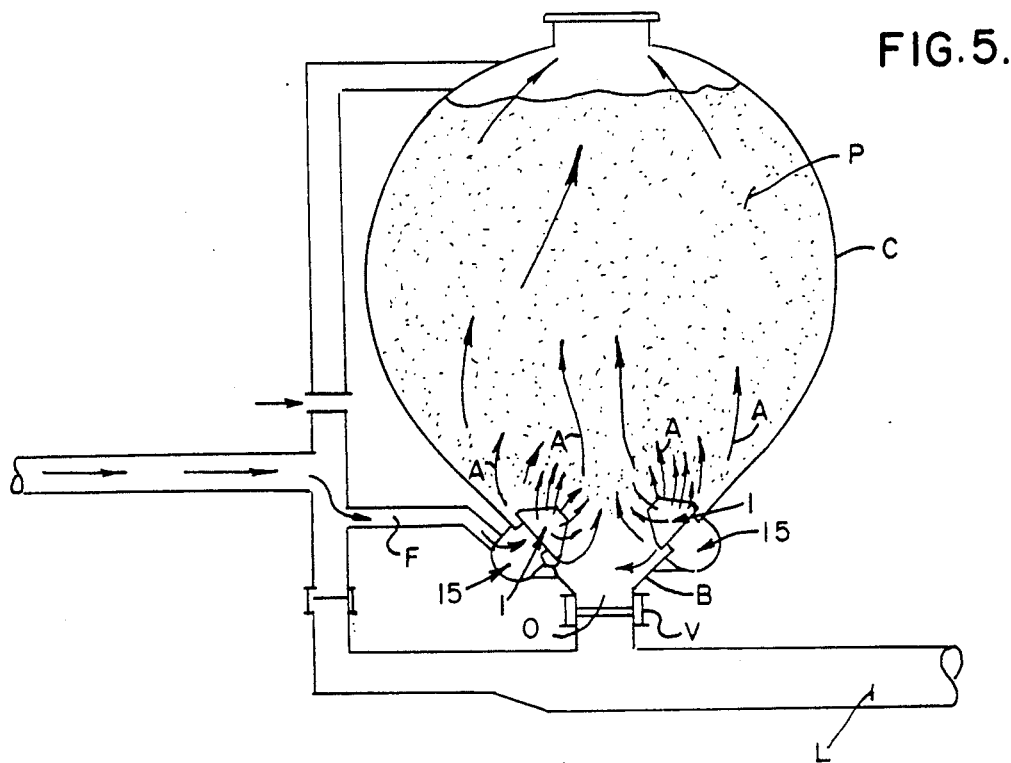
FIG. 6.

AERATION DEVICE FOR BULK MATERIAL CONTAINERS

REFERENCE TO COPENDING APPLICATION

Reference is hereby made to copending patent application Ser. No. 07/286,240 filed Dec. 19, 1988 entitled POROUS FILTER PAD FOR FLUID PRESSURE CONVEYING SYSTEMS of which this application is a continuation-in-part.

BACKGROUND OF THE INVENTION

The present invention relates to an an aeration device to facilitate the flow and discharge of bulk material granules and the like through a discharge opening in a bulk material container or hopper.

It is well known that the discharge of bulk material granules from a storage chamber in a bulk material can result in container product blockage or other interruptions in the flow of material which cause various conditions commonly known as arching, bridging, "rat-holing" and the like. Such storage chambers may be provided in various types of equipment including hopper trucks, hopper cars, storage silos, bins and other types of industrial storage chambers. When there is a blockage or interruption of the flow of bulk materials through a discharge opening in a storage chamber, substantial down time in clearing the discharge opening can result. In addition, it is well known that substantial waste or loss of bulk material product can occur when there is incomplete "clean-out" or removal of product from the storage chamber, as well as possible contamination to a subsequent product load from resulting incompletely removed product in a previous product load.

The aforementioned well known problems have resulted in the development of various devices for introducing air or sonic waves into the bulk material product within the storage chamber in order to break-up product blockage and facilitate the free flow of bulk material through a discharge opening in the storage chamber. While the types and kinds of aeration and other devices used for the above purpose are to numerous to mention, attention is directed to the following representative patents which disclose some of the different prior art efforts to solve the aforementioned problems: U.S. Pat. Nos. 3,092,010; 3,343,888; 3,829,022; 4,172,539; and 4,189,262.

One such aeration device that has been developed to date is known as the Butler ® Flowcone ® which is covered by U.S. Pat. No. 3,929,261. In this patent, a flexible cone shaped silicone rubber jacket is mounted over a complementary shaped aluminum casting having an air inlet passageway.

Air is introduced through the air passageway in the aluminum casting, and this causes the cone shaped rubber jacket to flutter or vibrate by air flowing past the flexible cone-shaped jacket. This device enhances the aeration of the bulk material so as to facilitate the discharge of the bulk material from the storage chamber. For reasons which will be discussed in detail hereafter, the aeration device of the present invention is discussed and compared to this particular prior art device, in order to show the many numerous advantages and features of the present invention which are believed to result over this commercially successful prior art device.

In my copending patent application Ser. No. 07/286,240 filed Dec. 19, 1988 and entitled POROUS FILTER PAD FOR FLUID PRESSURE CONVEYING SYSTEMS, I have disclosed a self-supporting molded plastic body porous filter pad with opposed walls. The porous filter pad or membrane of my prior copending application is constructed for use in conjunction with a fluid pressure conveying system, such as fluidized bed to assist in unloading bulk material product into a flow line or trough. As will further be made apparent in the discussion that follows, the aeration device of the present invention incorporates some of the features and teachings of my aforementioned prior copending application.

SUMMARY OF THE INVENTION

Among the several objects and advantages of the present invention include:

the provision of a new and improved aeration device that overcomes the aforenoted and other deficiencies of the prior art;

the provision of the aforementioned aeration device which increases overall efficiency and profitability with faster, more complete product unloading known prior art constructions;

the provision of the aforementioned aeration device which provides more balance air flow throughout bulk material product contained in the storage chamber, while minimizing or reducing damaging back pressure through an air blower system associated with the aeration device;

the provision of the aforementioned aeration device which virtually eliminates costly abrasion to the inner wall surface of the storage chamber and associated aluminum casting or fittings for the aeration device;

the provision of the aforementioned aeration device which substantially eliminates or prevents product contamination while meeting FDA standards over a wide range of bulk material products;

the provision of the aforementioned aeration device which is competitively priced with existing prior art units, while being more durable and longer lasting in use;

the provision of the aforementioned aeration device which is completely interchangeable with other prior art devices in the field, thus allowing customers to readily change without requiring substantial modification; and the provision of the aforementioned aeration device which is relatively simple and economical to manufacturer using widely available materials and conventional forming techniques; does not require substantial installation or maintenance; is extremely durable in operation and use; does not require frequent replacement; and is otherwise well adapted for the purposes intended.

Briefly stated, the aeration device of the present invention facilitates the flow and discharge of bulk material granules and other products through a discharge opening in a bulk material hopper container or storage chamber The aeration device includes at least one self-supporting molded plastic body which is adapted to overlie an air inlet in the bulk material container, at a predetermined distance above the discharge opening thereof. Each of the molded plastic hollow bodies associated with the bulk material container or storage chamber include an inner arched wall adapted to face the air inlet in the bulk material container, and an outer arched wall facing from the air inlet. The molded plastic hollow body is formed with a porous construction having a plurality of openings of predetermined porosity along the inner arched wall, a plurality of openings of predetermined smaller porosity along the outer arched wall, and inner tortuous pathways within the molded plastic hollow body between the openings in the inner and outer arched walls.

A plurality of openings of predetermined smaller porosity along the outer arched wall are smaller than the size of the bulk material granules in the bulk material container. A molded plastic hollow body includes a plurality of molded and bonded plastic particles which are formed in closer proximity to one another at least along the outer arched wall to form the openings of predetermined smaller porosity therein. A plurality of molded and bonded plastic particles in closer proximity to one another at least along the outer arched wall are compressed into a more compact and dense relationship as a coherent mass with openings of predetermined smaller porosity therein.

The molded plastic hollow body preferably has a general frusto-conical configuration with a closed planar top wall and a downwardly and outwardly extending peripherally continuous side wall which terminates in an open bottom at an outer free end thereof. The outer free end of the peripherally continuous side wall is adapted to be secured in proximity to an inner surface of the bulk material container or storage chamber in overlying and sealed relationship to the air inlet in the bulk material container or storage chamber. The outer free end of the peripherally continuous side wall has a complementary mating groove and/or projection means for sealed and interlocking relationship to an air inlet fitting which is adapted to be mounted relative to the air inlet of the bulk material container or storage chamber.

The molded plastic hollow body may be formed from a porous polycarbonate material, a porous polyethylene material, a porous polyamide or any other suitable porous molded plastic material for the purposes of the present invention.

These and other objects and advantages of the present invention will become more apparent from the ensuing description.

BRIEF DESCRIPTION OF THE DRAWINGS

In the drawings,

FIG. 4 is an exploded side elevation view of the aeration device and the principal component of the air inlet fitting associated therewith;

FIG. 5 is an enlarged side elevation view partially in section, of the aeration device and principal component of the air inlet fitting when assembled to one another; and FIG. 6 is a diagrammatic view of a bulk material container with aeration devices therein and showing the balanced air flow into product material granules contained within the bulk material container.

DESCRIPTION OF THE PREFERRED EMBODIMENT

The following detailed description illustrates the invention by way of example, and not by way of limitation. This description will clearly enable one skilled in the art to make and use the invention, and describes several embodiments, adaptions, variations, alternatives and uses of the invention, including what I presently believe is the best mode of carrying out the invention.

Figure 1:
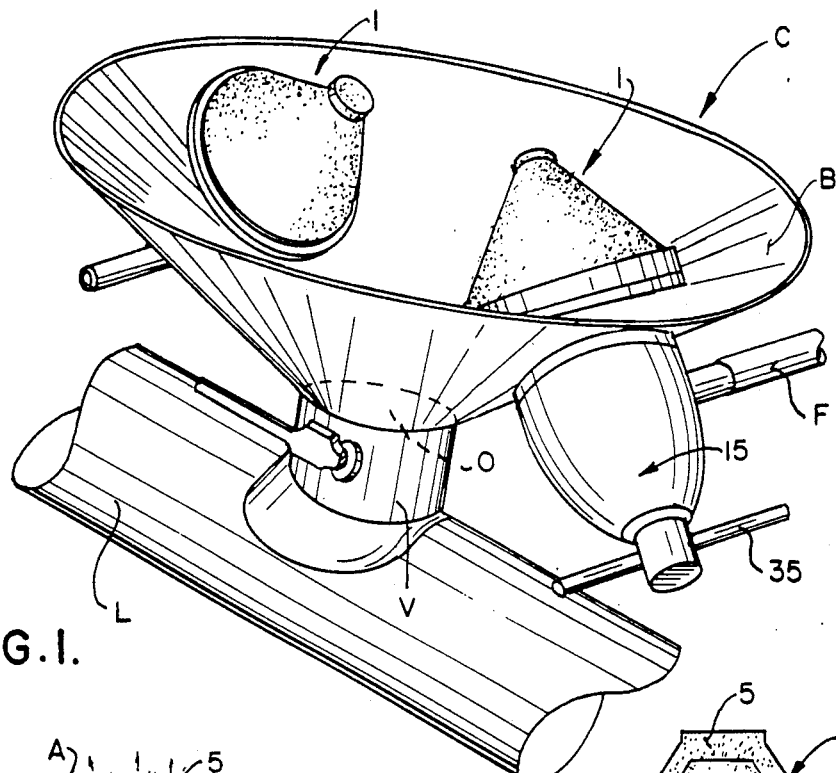
FIG. 1 is a fragmentary isometric view of a bulk material container or storage chamber having aeration devices of the type constructed in accordance with the present invention mounted therein.

The typical environment in which the aeration device of the present invention is intended to be used is best shown in FIG. 1 of the drawings. There, it will be seen that the fragmented portion of the bulk material container or storage chamber C includes a downwardly tapering or conically shaped bottom B having a discharge opening 0 at the lower end of the hopper or container bottom B which leads into a discharge control valve V, controlling the discharge of bulk granular material or the like from the hopper or container C into the transversely extending discharge line L, as is well known. It will be understood that the bulk material container C may be used in various types of equipment including hopper trucks, hopper cars, storage silos, bins and other types of containers where bulk material is stored. Incorporated within bottom area B of the bulk material hopper container C are a plurality of aeration devices 1 which are mounted to the container bottom B a predetermined distance above the discharge opening O, the general positioning of which is well known in the art. While any number of aeration devices 1 may be used in the bulk material container C as may be desired to suit the particulars required. As shown in FIG. 1 of the drawings, there are two such aeration devices 1 illustrated.

In order to understand the specific construction and operation of the aeration device 1 of the present invention, reference is made to FIGS. 2-6 of the drawings for a specific description, to facilitate an understanding of the present invention.

As best seen in FIGS. 2-5 of the drawings, each aeration device 1 includes a self-supporting molded plastic hollow body 3 which has a general frusto-conical shape including a closed planar top wall 5 and a downwardly and outwardly extending peripherally continuous side wall which terminates at an open bottom 9 at an outer free end 11 of the side wall 7. The outer free end 11 of the peripherally continuous side wall 7 is secured to an air inlet fitting 13 which is part of a valve member 15 mounted to the bottom area B of the bulk material hopper C. The outer free end 11 of the peripherally continuous side wall 7 includes a circumferentially continuous groove 17 which receives a complementary mating projection 19 associated with the air inlet fitting 13, for securely mounting the molded plastic hollow body 3 relative to the bottom B of the bulk material container C.

Figures 2, 3:
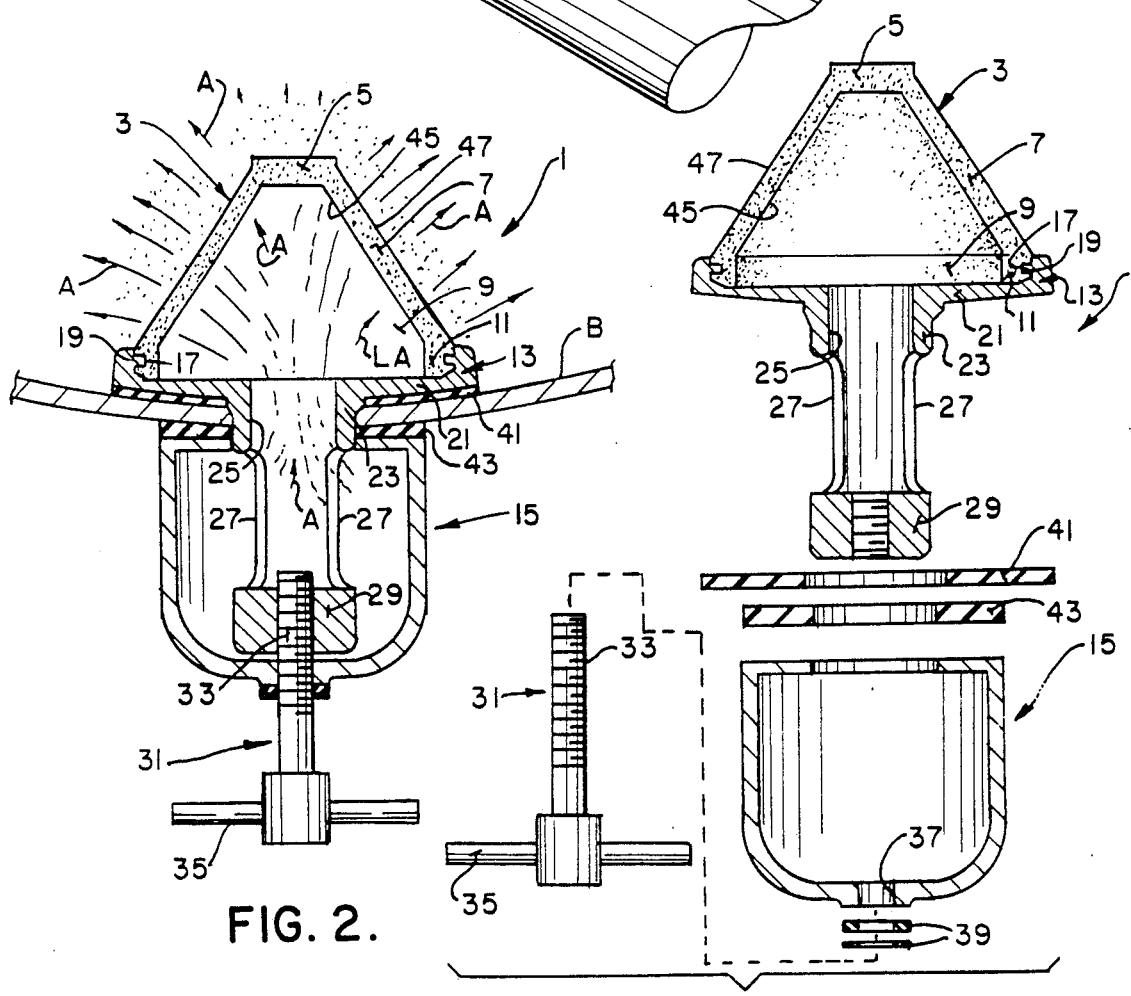
FIG. 2 is an assembled sectional view of one aeration device mounted relative to an associated bulk material container or storage chamber.
FIG. 3 is an exploded sectional view of the aeration device and associated fitting components shown in FIG. 2 of the drawings.

As will be seen in FIGS. 2-3 of the drawings, the outer free end 11 of the molded plastic hollow body 3 is also generally complementary conformed and shaped to the air inlet fitting 13 in the vicinity of the mating groove and projection 17, 19, thereby providing a combined sealed and interlocking relationship between the molded plastic hollow body 3 and the air inlet fitting 13.

It will be noted that the air inlet fitting 13 has a generally transversely extending base or end wall 21 which also closes off the open bottom 9 of the molded plastic hollow body 3, and a cylindrical, or axially extending projection/extension 23 extending from a base or end wall 21 of the air inlet fitting 13. The projection/extension 23 has a bore 25 extending axially therethrough and a plurality of inlet openings 27 which extend through the side of the projection/extension 23 to allow air to flow from air conduit F illustrated in FIG. 1 of the drawings, into the air inlet openings 27, 27, then through the bore 25 of the projection/extension 23, and into the open space bounded by the frusto-conically shaped molded plastic hollow body 3.

At the lower end of the projection/extension 23 of the air inlet fitting 13 is an internally threaded nut or ferrule 29 which is adapted to be threadably engaged by the valve fastener 31 having an elongated threaded shaft 33 for complementary threaded mating engagement with the nut or ferrule 29 of the air inlet fitting 13. The value fastener 31 includes a transversely extending handle 35 which is connected to the elongated threaded shaft 33 to facilitate manual rotation of the valve fastener 31, for tightening or loosening as desired. In addition to threadably engaging the nut or ferrule 29, connected to the projection/extension 23 of the air inlet fitting 13, the valve fastener 31 also may extend through or threadably engage the bore 37 in the valve retainer 15, as best seen in FIGS. 2-3 of the drawings. Suitable sealing washers 39, also engaged by the elongated shaft 33, are shown as being mounted to the exterior of the valve body 15 when the valve fastener 31 extends through the opening 37 of valve body 15 and engages the nut or ferrule 29 of the air inlet fitting 13. Additionally, it will be noted that the air inlet fitting and valve body 13, 15 respectively have sealing washers 41, 43 respectively associated therewith for engaging inner and outer wall surfaces of the bottom B of the bulk material container C, in order to confine the air flow to the desired passages and areas, as will be appreciated. FIG. 3 of the drawings shows each of these components in an exploded view, while FIG. 2 shows the same components in assembled relationship to one another, as has been described above.

Since the present invention is principally directed to the molded plastic body 3 of the aeration device 1, various different types of air inlet fittings and valve bodies, with associated components, may be varied to suit the particulars desired. It will be understood that the present invention requires the molded plastic hollow body 3 in the aeration device 1 to be suitably secured relative to an air inlet opening in the bottom B of a bulk material container C, at a predetermined distance above the discharge opening O.

Attention is now focused on the construction and operation of the molded plastic hollow body 3.

The frusto-conical shape of the molded plastic hollow body 3 includes an inner arched wall 45 and outer arched wall 47, both of which have a complementary corresponding frusto-conical truncate shape, as well. While the frusto-conical shape is preferred because of the ready interchangeability of the molded plastic hollow body 3 with respect to other types of competitor units currently existing in the field, it will also be understood that the molded plastic hollow body may have any shape desired, as long as it provides an overlying dome or other enveloping shape which performs the same function as the frusto-conical shape of the molded plastic hollow body 3 which is illustrated in the drawings.

The molded plastic hollow body 3 is formed from a porous polycarbonate, porous polyethylene, porous polyamide or any other suitable porous plastic material which can be constructed as described below. The porous construction for the molded plastic hollow body 3 may be provided by injection molding or otherwise forming a plurality of molded and bonded plastic particles into close proximity to one another, at least along the outer arched wall 47, so as to provide openings along the outer arched wall 47 of predetermined smaller porosity than the openings along the inner arched wall 45. Specifically, the molded and bonded particles are in closer proximity to one another along at least the outer arched wall 47 because the molded plastic hollow body of porous construction, when formed, is compressed into a more compact and dense relationship as a coherent mass, thereby providing the openings of predetermined smaller porosity along the outer arched wall 47.

As specifically disclosed and illustrated in my aforementioned copending patent application, the molded plastic hollow body 3 also includes an inner tortuous pathways between the inner and outer arched wall 45, 47 of the molded plastic hollow body 3, extending between the openings in the inner and outer arched wall 45, 47. The inner connecting tortuous pathways, as specifically shown in my aforementioned copending patent application, are reduced or constricted in size so that they extend away from larger porosity openings along the inner arched wall 45 so as to form the openings of predetermined smaller porosity along the outer arched wall 47. For example, if the openings along the inner arched wall 45 have about 120 micron porosity, the openings at or in the vicinity of the outer arched wall 47 have a much smaller micron porosity, even down to a 5 micron porosity along the outer arched wall 47.

As a result, pressurized air may be passed through the molded plastic hollow body 3, first through the larger porosity openings along the inner arched wall 45, through the tortuous pathways in the molded plastic hollow body 3, and then out through the smaller predetermined porosity openings in the outer arched wall 47. This permits air to readily pass through the porous molded plastic hollow body 3, but at the same time, prevents any granular material particles contained within the bulk storage container C to block or trap the openings of predetermined smaller porosity in the outer arched wall 47. In fact, the micron porosity in the plurality of porous openings along the outer arched wall 47 are preferably smaller than the bulk material granules in the bulk material container C.

Reference is now made to FIGS. 2 and 6 of the drawings for a specific description of the operation of the aeration devices 1 in a bulk hopper container or storage chamber C. As previously described, air is introduced via the air flow line F into the valve chambers 15 of the aeration devices 1, and then into the molded plastic hollow body 3 of the present invention. Air which is represented by the arrows A passes through the porous molded plastic hollow body 3, and into the bulk material particles P, as shown in FIG. 6 of the drawings, to aerate and break-up the bulk material particles P, in order to prevent any blockage or interruption as the bulk material particles P are discharged through the opening 0 in the bottom B of the bulk material container C.

Unlike all prior art devices, the porous molded plastic hollow body 3 of frusto-conical configuration permits air to be evenly dispersed into the bulk material particles throughout the entire axial height and peripheral extent of the porous molded plastic hollow body 3. As a result, the porous molded plastic hollow body 3 of the present invention has been determined, in actual tests, to provide up to 15% faster dry bulk unloading, as compared with other prior art devices, including the Butler ® Flow Cone ® devices which are described in the background of this invention. Specifically, in actual tests, it has been determined that the aeration device 1 of the present invention provides up to 15% faster unloading than the Butler ® Flow Cone ® device, and from 20 to 50% faster bulk material unloading than other competitive devices.

For example, in one test, 58,700 lbs. of soft wheat flour was unloaded from a 15,000 cubic foot bulk material container that had Butler ® Flow Cone ® in it, with an unloading time of 28 minutes and 31 seconds. After cleaning this very same bulk material container and installing porous molded plastic hollow bodies 3 constructed in accordance with the present invention, 59,130 lbs. of soft wheat flour was unloaded from the identical bulk material container in 24 minutes 47 seconds. This resulted in 15.8% less unloading time as compared with the most commercially successful competitive devices on the market today.

With the porous molded plastic hollow body cones 3 of the present invention in the above test, additional air pressure is able to be introduced through the aeration devices 1 into the bulk storage container C because there is less back pressure into the porous molded plastic hollow body 3 devices of the present invention. As explained above, the openings of predetermined smaller porosity along the outer arched wall 47 of the porous molded plastic hollow body 3 prevents back air pressure from being re-introduced through an air blower system (not shown) associated with the aeration device 1. Another important point is that the porous molded plastic hollow body 3 of the present invention allows air to be introduced into the bulk material particles contained within the bulk storage chamber C but does not let the bulk material particles clog or otherwise block the aeration device 1. In this regard, preferably the openings of predetermined smaller porosity along the outer arched wall 47 are smaller than the granular size of the bulk material particles P. Also, during wash cycles in cleaning the bulk storage container C, the bulk material particles P will not stick or otherwise become entrapped into the porous molded plastic hollow body 3, as sometimes occurs with prior art devices.

In the Butler ® Flow Cone ®, air must flow out from underneath the flexible cone shaped silicone rubber jacket, proceeding first in a downward direction parallel with the cone. When coupled with the movement of the bulk material particles, this can cause wearing of the air inlet fitting or even hopper wear-through, in some cases. With the porous molded plastic hollow body 3 of the present invention, air is distributed throughout the pores of the entire body 3, which not only provides more thorough fluidization, but also prevents wearing of the air inlet fitting castings or to the hopper themselves.

Applicant believes that he has developed a significant advance for aeration devices used in bulk storage containers, in order to facilitate the free and uninterrupted flow of bulk material particles through a discharge outlet as desired. Even under tests with the commercial product on the market, namely the Butler ® Flow Cone ® device it has been determined that, the aeration device 1 of the present invention significantly out performs such devices in a wide range of bulk granular material particles including, starch, flour, kaloin clay, soda ash, hydrate lime, plastic pellets, etc. It will thus be readily seen that all of the foregoing features and advantages of the present invention have been obtained in the herein disclosed and illustrated aeration device of the present invention.

As various changes could be made in the above constructions without departing from the scope of the invention, it is intended that all matter contained in the above description or shown in the accompanying drawings shall be interpreted as illustrative and not in a limiting sense.

I claim:

1. An aeration device to facilitate the flow and discharge of bulk material granules and the like through a discharge opening in a bulk material container, comprising at least one rigid, and independently self-supporting molded plastic hollow body adapted to overlie an air inlet in said bulk material container at a predetermined distance above the discharge opening thereof, each said molded plastic hollow body having an inner arched wall adapted to face the air inlet in said bulk material container, and an outer arched wall, a plurality of openings of predetermined porosity along said inner arched wall, a plurality of openings of predetermined smaller porosity along said outer arched wall, inner tortuous pathways within said molded plastic hollow body between said openings in said inner and outer arched walls, the plurality of openings of predetermined smaller porosity along said outer arched wall are smaller than the size of the bulk material granules in said bulk material container, said molded plastic hollow body comprising a plurality of molded and bonded plastic particles which are formed in closer proximity to one another at least along the outer arched wall provided with openings of predetermined smaller porosity, the plurality of molded and bonded plastic particles being in closer proximity to one another at least along said outer arched wall are compressed into a more compact and dense relationship as a coherent mass with said openings of predetermined smaller porosity therein, said molded plastic hollow body having a general frusto-conical configuration with a closed planar top wall and a downwardly and outwardly extending peripheral continuous side wall which terminates at an open bottom at an outer free end thereof, and said outer free end of said peripherally continuous side wall being adapted to be secured in proximity to an inner surface of the bulk material container in overlying and sealed relationship to the air inlet in the bulk material container, and said outer free end of said peripherally continuous side wall being secured to an air inlet fitting which is also adapted to be mounted relative to the air inlet of the bulk material container.

2. The aeration device as defined in claim 1 wherein the outer free end of said peripherally continuous side wall and said air inlet fitting have complementary mating groove and projection means for sealed and interlocked relationship to one another.

3. The aeration device as defined in claim 1 wherein said molded plastic hollow body is formed from porous polycarbonate.

4. The aeration device as defined in claim 1 wherein said molded plastic hollow body is formed from porous polyethylene.

5. The aeration device as defined in claim 1 wherein said molded plastic hollow body is formed from porous polyamide.

6. The aeration device as defined in claim 1 wherein the molded plastic hollow body is configured to disperse air throughout essentially the entire axial height of and peripheral extent of said molded plastic hollow body.

7. The aeration device as defined in claim 6 wherein said molded plastic hollow body has a general frusto-conical configuration with a closed planar top wall and a downwardly and outwardly extending peripherally continuous side wall which terminates at an open bottom at an outer free end thereof.

8. The aeration device as defined in claim 1 wherein said molded plastic hollow body comprises a plurality of molded and bonded plastic particles which are formed in closer proximity to one another at least along the outermost wall thereof.

* * * * *